(12) United States Patent
Tabb et al.

(10) Patent No.: US 10,176,226 B2
(45) Date of Patent: Jan. 8, 2019

(54) RELATION AWARE AGGREGATION (RAA) ON NORMALIZED DATASETS

(71) Applicant: Looker Data Sciences, Inc., Santa Cruz, CA (US)

(72) Inventors: Lloyd Tabb, Santa Cruz, CA (US); Michael Toy, Los Altos, CA (US); Scott Hoover, Santa Cruz, CA (US)

(73) Assignee: LOOKER DATA SCIENCES, INC., Santa Cruz, CA (US)

(*) Notice: Subject to any disclaimer, the term of this patent is extended or adjusted under 35 U.S.C. 154(b) by 739 days.

(21) Appl. No.: 14/555,013

(22) Filed: Nov. 26, 2014

(65) Prior Publication Data

US 2016/0147881 A1    May 26, 2016

(51) Int. Cl.
*G06F 17/30* (2006.01)

(52) U.S. Cl.
CPC ............... *G06F 17/30489* (2013.01)

(58) Field of Classification Search
CPC ......... G06F 17/30489; G06F 17/30595; G06F 17/30864
See application file for complete search history.

(56) References Cited

U.S. PATENT DOCUMENTS

| | | | |
|---|---|---|---|
| 6,282,541 B1* | 8/2001 | Hoa | G06F 17/30489 |
| 6,430,550 B1* | 8/2002 | Leo | G06F 17/30445 |
| | | | 707/623 |
| 6,477,525 B1* | 11/2002 | Bello | G06F 17/30457 |
| 6,775,682 B1* | 8/2004 | Ballamkonda | G06F 17/30489 |
| 6,850,927 B1* | 2/2005 | Hsu | G06F 17/30463 |
| 7,181,450 B2 | 2/2007 | Malloy et al. | |
| 8,122,033 B2 | 2/2012 | Le et al. | |
| 8,478,775 B2 | 7/2013 | Netz et al. | |
| 2001/0013030 A1* | 8/2001 | Colby | G06F 17/30312 |
| 2004/0117356 A1* | 6/2004 | Chen | G06F 17/30595 |
| 2005/0138001 A1* | 6/2005 | Mittal | G06F 17/30489 |
| 2006/0116989 A1* | 6/2006 | Bellamkonda | G06F 17/30489 |
| 2006/0294129 A1* | 12/2006 | Stanfill | G06F 17/30489 |
| 2008/0313132 A1* | 12/2008 | Hao | H04L 45/00 |
| 2009/0077010 A1 | 3/2009 | Muras et al. | |
| 2009/0177621 A1* | 7/2009 | Le | G06F 17/30442 |
| 2009/0228433 A1* | 9/2009 | Aguilar Saborit | G06F 17/30489 |
| 2010/0088315 A1* | 4/2010 | Netz | G06F 17/30501 |
| | | | 707/737 |
| 2012/0215810 A1 | 8/2012 | Evans et al. | |
| 2013/0290293 A1* | 10/2013 | Weyerhaeuser | G06F 17/30433 |
| | | | 707/714 |
| 2014/0188906 A1* | 7/2014 | Muller | G06F 17/30339 |
| | | | 707/752 |
| 2014/0280332 A1 | 9/2014 | Porterfield | |
| 2014/0310232 A1 | 10/2014 | Plattner et al. | |

(Continued)

*Primary Examiner* — Shiow-Jy Fan
(74) *Attorney, Agent, or Firm* — Steven M. Greenberg, Esq.; Shutts & Bowen LLP

(57) ABSTRACT

The present disclosure provides methods for performing a computation with an aggregate function using a database query, wherein the database query joins a plurality of database tables and includes a distinct aggregation function, which, when executed against one or more databases aggregates only values of database records corresponding to distinct keys by which the tables are joined, regardless of the cardinality of the joined tables. Related devices and systems are also provided.

19 Claims, 3 Drawing Sheets

(56) References Cited

U.S. PATENT DOCUMENTS

2014/0372368 A1* 12/2014 Schroetel .......... G06F 17/30592
707/603
2014/0372411 A1* 12/2014 Attaluri ............. G06F 17/30979
707/722

* cited by examiner

RELATION AWARE AGGREGATION (RAA) ON NORMALIZED DATASETS

INTRODUCTION

Structured Query Language (SQL) databases are designed to work optimally when data is stored in collections of relatively compact units, along with data needed to specify the relational connection between collections in the database. These disparate sources of information are then combined using a variety of relational combinatoric calculations to create a data set with all of the appropriate information needed to answer a question or query.

This "normalization" of data makes it possible for the database to store and index the data efficiently and to theoretically have the flexibility to explore the data along any dimension. However, queries against data in this form can be inefficient, requiring a second layer of processing on the normalized data, in order to respond to queries that join more than one table.

This second layer of processing can be avoided if the set of questions the database is expected to answer efficiently is known in advance. A common solution is to build a summarization layer of data on top of the normalized tables. This is inefficient in terms of space, but removes the computational burden.

SUMMARY

Relation Aware Aggregation (RAA) is a method of computing aggregate functions on data sets that avoids the inefficiencies of normalized data while still maintaining the flexibility of a pure normalized database. RAA provides an effective means of obtaining result sets for aggregate functions, while reducing the number of processing steps and/or memory required to obtain such result sets.

The present disclosure provides methods for performing a computation with an aggregate function using a database query, wherein the database query joins a plurality of database tables and includes a distinct aggregation function, which, when executed against one or more databases aggregates only values of database records corresponding to distinct keys by which the tables are joined, regardless of the cardinality of the joined tables. Related devices and systems are also provided.

Aspects, including embodiments, of the present subject matter described herein may be beneficial alone or in combination, with one or more other aspects or embodiments. Without limiting the foregoing or subsequent description, certain non-limiting aspects of the disclosure numbered 1-86 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below.

1. In one aspect, the present disclosure provides a method for performing an aggregate function using a database query, the method including:
   executing a database query with a processor of a database engine having access to one or more databases, wherein the database query joins a plurality of database tables of the one or more databases, and includes a distinct aggregation function, which, when executed against the one or more databases, aggregates only values of database records corresponding to distinct keys by which the tables are joined, regardless of the cardinality of the joined tables.

2. The method of aspect 1, wherein the processor is comprised by a server device, and wherein the method includes providing results of the database query to a client device over a network connection.

3. The method of aspect 1 or 2, wherein the one or more databases are relational databases and the database query is a single Structured Query Language (SQL) query statement.

4. The method of aspect 3, wherein the method includes:
   generating a distinct key value-record value composite integer for each record value to be aggregated via the distinct aggregation function, wherein generating the distinct key value-record value composite integer includes:
   applying a uniform hash function to covert a key value corresponding to a record value into a random value; and
   adding the record value to the random value to provide a distinct key value-record value composite integer.

5. The method of aspect 4, wherein the distinct aggregation function is a summation function configured to compute a sum of record values corresponding to distinct keys, and wherein the summation function includes
   summing the distinct key value-record value composite integers and
   subtracting the sum of the random values to provide the sum of the record values corresponding to distinct keys.

6. The method of aspect 4, wherein the distinct aggregation function is an average function configured to compute an average of record values corresponding to distinct keys, and wherein the average function includes
   summing the distinct key value-record value composite integers,
   subtracting the sum of the random values to obtain the sum of the record values corresponding to distinct keys, and
   dividing the sum of the record values corresponding to distinct keys by the number of distinct keys to provide the average of the record values corresponding to the distinct keys.

7. The method of any one of aspects 4-6, including selecting for use in connection with the generation of the distinct key value-record value composite integer a bit depth data type for the distinct key value-record value composite integer which is sufficient to contain a full summation of all the record values to be aggregated.

8. The method of aspect 1, wherein the executing includes:
   accessing a collection of aggregation computation instructions;
   selecting from the collection of aggregation computation instructions, instructions which, when executed by the processor of the database engine, cause the database engine to:
   examine only the first instance of each given key value; and
   utilize the record value corresponding to the first instance of the given key value in the distinct aggregation function.

9. The method of aspect 8, wherein the collection of computation instructions is provided to the database engine by a client device.
10. The method of aspect 8, wherein the collection of computation instructions is loaded as source or compiled code by the database engine.
11. The method of aspect 8, wherein the collection of computation instructions is comprised by the database engine.
12. The method of aspect 1, wherein the executing includes accessing a user-defined library, wherein the user-defined library includes instructions, which, when executed by the processor of the database engine, cause the processor of the database engine to:
   examine only the first instance of each given key value; and
   utilize the record value corresponding to the first instance of the given key value in the distinct aggregation function.
13. The method of aspect 12, wherein the user-defined library is stored in database memory.
14. In another aspect, the present disclosure provides a method for facilitating the performance an aggregate function using a database query, wherein the database query joins a plurality of database tables and includes a distinct aggregation function, which, when executed against one or more databases aggregates only values of database records corresponding to distinct keys by which the tables are joined, regardless of the cardinality of the joined tables, the method including:
   providing a collection of aggregation computation instructions to a processor of a database engine, wherein the collection of aggregation computation instructions includes instructions, which, when executed by the processor of the database engine, cause the database engine to:
      examine only the first instance of each given key value; and
      utilize the record value corresponding to the first instance of the given key in the distinct aggregation function.
15. In another aspect, the present disclosure provides a method for facilitating the performance an aggregate function using a database query, wherein the database query joins a plurality of database tables and includes a distinct aggregation function, which, when executed against one or more databases aggregates only values of database records corresponding to distinct keys by which the tables are joined, regardless of the cardinality of the joined tables, the method including:
   providing a user-defined library accessible to a server device, wherein the user-defined library includes instructions, which, when executed by a processor of the server device, cause the server device to:
      examine only the first instance of each given key value; and
      utilize the record value corresponding to the first instance of the given key in the distinct aggregation function.
16. In another aspect, the present disclosure provides a method for performing an aggregate function using a database query, the method including:
   receiving a database query at a server device, wherein the database query joins a plurality of database tables and includes a distinct aggregation function, which, when executed against one or more databases aggregates only values of database records corresponding to distinct keys by which the tables are joined, regardless of the cardinality of the joined tables;
   executing the database query against the one or more databases; and
   providing results of the database query to a client device over a network connection.
17. The method of aspect 16, wherein the one or more databases are relational databases and the database query is a single Structured Query Language (SQL) query statement.
18. The method of aspect 17, wherein the method includes:
   generating a distinct key value-record value composite integer for each record value to be aggregated via the distinct aggregation function, wherein generating the distinct key value-record value composite integer includes:
      applying a uniform hash function to covert a key value corresponding to a record value into a random value; and
      adding the record value to the random value to provide a distinct key value-record value composite integer.
19. The method of aspect 18, wherein the distinct aggregation function is a summation function configured to compute a sum of record values corresponding to distinct keys, and wherein the summation function includes
   summing the distinct key value-record value composite integers and
   subtracting the sum of the random values to provide the sum of the record values corresponding to distinct keys.
20. The method of aspect 18, wherein the distinct aggregation function is an average function configured to compute an average of record values corresponding to distinct keys, and wherein the average function includes
   summing the distinct key value-record value composite integers,
   subtracting the sum of the random values to obtain the sum of the record values corresponding to distinct keys, and
   dividing the sum of the record values corresponding to distinct keys by the number of distinct keys to provide the average of the record values corresponding to the distinct keys.
21. The method of any one of aspects 18-20, including selecting for use in connection with the generation of the distinct key value-record value composite integer a bit depth data type for the distinct key value-record value composite integer which is sufficient to contain a full summation of all the record values to be aggregated.
22. The method of aspect 16, wherein the executing includes
   accessing a collection of aggregation computation instructions;
   selecting from the collection of aggregation computation instructions, instructions which, when executed by a processor of the server device, cause the server device to:
      examine only the first instance of each given key value; and
      utilize the record value corresponding to the first instance of the given key value in the distinct aggregation function.

23. The method of aspect 16, wherein the executing includes
   accessing a user-defined library, wherein the user-defined library includes instructions, which, when executed by a processor of the server device, cause the server device to:
      examine only the first instance of each given key value; and
      utilize the record value corresponding to the first instance of the given key value in the distinct aggregation function.
24. In another aspect, the present disclosure provides a method for performing an aggregate function using a database query, the method including:
   receiving, at a server device, a query input from a client device over a network connection;
   generating a database query based on the query input, wherein the database query joins a plurality of database tables and includes a distinct aggregation function, which, when executed against one or more databases aggregates only values of database records corresponding to distinct keys by which the tables are joined, regardless of the cardinality of the joined tables;
   executing the database query against the one or more databases; and
   returning results of the database query to the client device over a network connection.
25. The method of aspect 24, wherein the one or more databases are relational databases and the database query is a single Structured Query Language (SQL) query statement.
26. The method of aspect 25, wherein the method includes:
   generating a distinct key value-record value composite integer for each record value to be aggregated via the distinct aggregation function, wherein generating the distinct key value-record value composite integer includes:
      applying a uniform hash function to covert a key value corresponding to a record value into a random value; and
      adding the record value to the random value to provide a distinct key value-record value composite integer.
27. The method of aspect 26, wherein the distinct aggregation function is a summation function configured to compute a sum of record values corresponding to distinct keys, and wherein the summation function includes
   summing the distinct key value-record value composite integers and
   subtracting the sum of the random values to provide the sum of the record values corresponding to distinct keys.
28. The method of aspect 26, wherein the distinct aggregation function is an average function configured to compute an average of record values corresponding to distinct keys, and wherein the average function includes
   summing the distinct key value-record value composite integers,
   subtracting the sum of the random values to obtain the sum of the record values corresponding to distinct keys, and
   dividing the sum of the record values corresponding to distinct keys by the number of distinct keys to provide the average of the record values corresponding to the distinct keys.
29. The method of aspect any one of aspects 26-28, including selecting for use in connection with the generation of the distinct key value-record value composite integer a bit depth data type for the distinct key value-record value composite integer which is sufficient to contain a full summation of all the record values to be aggregated.
30. The method of aspect 24, wherein the executing includes
   accessing a collection of aggregation computation instructions;
   selecting from the collection of aggregation computation instructions, instructions which, when executed by a processor of the server device, cause the server device to:
      examine only the first instance of each given key value; and
      utilize the record value corresponding to the first instance of the given key value in the distinct aggregation function.
31. The method of aspect 24, wherein the executing includes accessing a user-defined library, wherein the user-defined library includes instructions, which, when executed by a processor of the server device, cause the server device to:
   examine only the first instance of each given key value; and
   utilize the record value corresponding to the first instance of the given key value in the distinct aggregation function.
32. The method of aspect 31, wherein the user-defined library is stored in database memory.
33. In another aspect, the present disclosure provides a method for generating a distinct key value-record value composite integer for use in an aggregation function, the method including:
   applying a uniform hash function to covert a key value corresponding to a record value into a random value; and
   adding the record value to the random value to provide a distinct key value-record value composite integer, wherein the applying and adding are performed by a processor of a database engine.
34. The method of aspect 33, including selecting for use in connection with the generation of the distinct key value-record value composite integer a bit depth data type for the distinct key value-record value composite integer which is sufficient to contain a full summation of all the record values to be aggregated.
35. In another aspect, the present disclosure provides a method for generating a distinct key value-record value composite integer for use in an aggregation function, the method including:
   applying a uniform hash function to covert a key value corresponding to a record value into a random value; and
   adding the record value to the random value to provide a distinct key value-record value composite integer, wherein the applying and adding are performed by a processor of a server device.
36. The method of aspect 35, including selecting for use in connection with the generation of the distinct key value-record value composite integer a bit depth data type for the distinct key value-record value composite integer which is sufficient to contain a full summation of all the record values to be aggregated.

37. In another aspect, the present disclosure provides a non-transitory recording medium including instructions, which, when executed by a processor of a database engine, cause the database engine to:
   execute a database query against one or more databases, wherein the database query joins a plurality of database tables and includes a distinct aggregation function, which, when executed against the one or more databases aggregates only values of database records corresponding to distinct keys by which the tables are joined, regardless of the cardinality of the joined tables.

38. The non-transitory recording medium of aspect 37, wherein the processor is comprised by a server device, and wherein the non-transitory recording medium includes instructions, which when executed by the processor, cause the processor to provide results of the database query to a client device over a network connection.

39. The non-transitory recording medium of aspect 37 or 38, wherein the one or more databases are relational databases and the database query is a single Structured Query Language (SQL) query statement.

40. The non-transitory recording medium of aspect 39, wherein the non-transitory recording medium includes instructions, which, when executed by the processor, cause the database engine to:
   generate a distinct key value-record value composite integer for each record value to be aggregated via the distinct aggregation function, wherein generating the distinct key value-record value composite integer includes:
      applying a uniform hash function to covert a key value corresponding to a record value into a random value; and
      adding the record value to the random value to provide a distinct key value-record value composite integer.

41. The non-transitory recording medium of aspect 40, wherein the distinct aggregation function is a summation function configured to compute a sum of record values corresponding to distinct keys, and wherein the summation function includes
   summing the distinct key value-record value composite integers and
   subtracting the sum of the random values to provide the sum of the record values corresponding to distinct keys.

42. The non-transitory recording medium of aspect 40, wherein the distinct aggregation function is an average function configured to compute an average of record values corresponding to distinct keys, and wherein the average function includes
   summing the distinct key value-record value composite integers,
   subtracting the sum of the random values to obtain the sum of the record values corresponding to distinct keys, and
   dividing the sum of the record values corresponding to distinct keys by the number of distinct keys to provide the average of the record values corresponding to the distinct keys.

43. The non-transitory recording medium of any one of aspects 39-42, wherein the non-transitory recording medium includes instructions, which, when executed by the processor, cause the database engine to select for use in connection with the generation of the distinct key value-record value composite integer a bit depth data type for the distinct key value-record value composite integer which is sufficient to contain a full summation of all the record values to be aggregated.

44. The non-transitory recording medium of aspect 37, wherein the executing includes
   accessing a collection of aggregation computation instructions;
   selecting from the collection of aggregation computation instructions, instructions which, when executed by the processor of the database engine, cause the database engine to:
      examine only the first instance of each given key value; and
      utilize the record value corresponding to the first instance of the given key value in the distinct aggregation function.

45. The non-transitory recording medium of aspect 37, wherein the executing includes
   accessing a user-defined library, wherein the user-defined library includes instructions, which, when executed by the processor of the database engine, cause the processor of the database engine to:
      examine only the first instance of each given key value; and
      utilize the record value corresponding to the first instance of the given key value in the distinct aggregation function.

46. In another aspect, the present disclosure provides a non-transitory recording medium including instructions which, when executed by a processor of a server device, cause the server device to:
   receive a query input from a client device over a network connection;
   generate a database query based on the query input, wherein the database query joins a plurality of database tables and includes a distinct aggregation function, which, when executed against one or more databases aggregates only values of database records corresponding to distinct keys by which the tables are joined, regardless of the cardinality of the joined tables;
   execute the database query against the one or more databases; and
   return results of the database query to the client device over a network connection.

47. The non-transitory recording medium of aspect 46, wherein the one or more databases are relational databases and the database query is a single Structured Query Language (SQL) query statement.

48. The non-transitory recording medium of aspect 47, wherein the non-transitory recording medium includes instructions, which, when executed by the processor of the server device, cause the server device to: generate a distinct key value-record value composite integer for each record value to be aggregated via the distinct aggregation function, wherein generating the distinct key value-record value composite integer includes:
   applying a uniform hash function to covert a key value corresponding to a record value into a random value; and
   adding the record value to the random value to provide a distinct key value-record value composite integer.

49. The non-transitory recording medium of aspect 48, wherein the distinct aggregation function is a summation function configured to compute a sum of values corresponding to distinct keys, and wherein the summation function includes summing the distinct key value-record value composite integers and subtracting the sum of the random values to provide the sum of the record values corresponding to distinct keys.

50. The non-transitory recording medium of aspect 48, wherein the distinct aggregation function is an average function configured to compute an average of record values corresponding to distinct keys, and wherein the average function includes summing the distinct key value-record value composite integers, subtracting the sum of the random values to obtain the sum of the record values corresponding to distinct keys, and dividing the sum of the record values corresponding to distinct keys by the number of distinct keys to provide the average of the values corresponding to the distinct keys.

51. The non-transitory recording medium of any one of aspects 48-50, wherein the non-transitory recording medium includes instructions, which, when executed by the processor of the server device, cause the server device to select for use in connection with the generation of the distinct key value-record value composite integer a bit depth data type for the distinct key value-record value composite integer which is sufficient to contain a full summation of all the record values to be aggregated.

52. The non-transitory recording medium of aspect 46, wherein the executing includes accessing a collection of aggregation computation instructions;

selecting from the collection of aggregation computation instructions, instructions which, when executed by the processor of the server device, cause the server device to:

examine only the first instance of each given key value; and utilize the record value corresponding to the first instance of the given key value in the distinct aggregation function.

53. The non-transitory recording medium of aspect 46, wherein the executing includes accessing a user-defined library, wherein the user-defined library includes instructions, which, when executed by a processor of the server device, cause the server device to:

examine only the first instance of each given key value; and utilize the record value corresponding to the first instance of the given key value in the distinct aggregation function.

54. In another aspect, the present disclosure provides a non-transitory recording medium including instructions, which, when executed by a processor of a server device, cause the server device to:

execute a database query against one or more databases, wherein the database query joins a plurality of database tables and includes a distinct aggregation function, which, when executed against the one or more databases aggregates only values of database records corresponding to distinct keys by which the tables are joined, regardless of the cardinality of the joined tables; and provide results of the database query to a client device over a network connection.

55. The non-transitory recording medium of aspect 54, wherein the one or more databases are relational databases and the database query is a single Structured Query Language (SQL) query statement.

56. The non-transitory recording medium of aspect 55, wherein the non-transitory recording medium includes instructions, which, when executed by the processor of the server device, cause the server device to:

generate a distinct key value-record value composite integer for each record value to be aggregated via the distinct aggregation function, wherein generating the distinct key value-record value composite integer includes:

applying a uniform hash function to covert a key value corresponding to a record value into a random value; and adding the record value to the random value to provide a distinct key value-record value composite integer.

57. The non-transitory recording medium of aspect 56, wherein the distinct aggregation function is a summation function configured to compute a sum of record values corresponding to distinct keys, and wherein the summation function includes summing the distinct key value-record value composite integers and subtracting the sum of the random values to provide the sum of the record values corresponding to distinct keys.

58. The non-transitory recording medium of aspect 56, wherein the distinct aggregation function is an average function configured to compute an average of record values corresponding to distinct keys, and wherein the average function includes summing the distinct key value-record value composite integers, subtracting the sum of the random values to obtain the sum of the record values corresponding to distinct keys, and dividing the sum of the record values corresponding to distinct keys by the number of distinct keys to provide the average of the record values corresponding to the distinct keys.

59. The non-transitory recording medium of any one of aspects 56-58, wherein the non-transitory recording medium includes instructions, which, when executed by the processor of the server device, cause the server device to select for use in connection with the generation of the distinct key value-record value composite integer a bit depth data type for the distinct key value-record value composite integer which is sufficient to contain a full summation of all the record values to be aggregated.

60. The non-transitory recording medium of aspect 54, wherein the executing includes accessing a collection of aggregation computation instructions;

selecting from the collection of aggregation computation instructions, instructions which, when executed by the processor of the server device, cause the server device to:

examine only the first instance of each given key value; and utilize the record value corresponding to the first instance of the given key value in the distinct aggregation function.

61. The non-transitory recording medium of aspect 54, wherein the executing includes accessing a user-defined library, wherein the user-defined library includes instructions, which, when executed by a processor of the server device, cause the server device to:

examine only the first instance of each given key value; and utilize the record value corresponding to the first instance of the given key value in the distinct aggregation function.

62. In another aspect, the present disclosure provides a non-transitory recording medium including instructions which, when executed by a processor of a server device, cause the server device to:

receive a query input from a client device over a network connection;

generate a database query based on the query input, wherein the database query joins a plurality of database tables and includes a distinct aggregation function, which, when executed against one or more databases aggregates only values of database records corresponding to distinct keys by which the tables are joined, regardless of the cardinality of the joined tables;

execute the database query against the one or more databases; and return results of the database query to the client device over a network connection.

63. The non-transitory recording medium of aspect 62, wherein the one or more databases are relational databases and the database query is a single Structured Query Language (SQL) query statement.

64. The non-transitory recording medium of aspect 63, wherein the non-transitory recording medium includes instructions, which, when executed by the processor of the server device, cause the server device to: generate a distinct key value-record value composite integer for each record value to be aggregated via the distinct aggregation function, wherein generating the distinct key value-record value composite integer includes:

applying a uniform hash function to covert a key value corresponding to a record value into a random value; and adding the record value to the random value to provide a distinct key value-record value composite integer.

65. The non-transitory recording medium of aspect 64, wherein the distinct aggregation function is a summation function configured to compute a sum of values corresponding to distinct keys, and wherein the summation function includes summing the distinct key value-record value composite integers and subtracting the sum of the random values to provide the sum of the record values corresponding to distinct keys.

66. The non-transitory recording medium of aspect 64, wherein the distinct aggregation function is an average function configured to compute an average of record values corresponding to distinct keys, and wherein the average function includes summing the distinct key value-record value composite integers, subtracting the sum of the random values to obtain the sum of the record values corresponding to distinct keys, and dividing the sum of the record values corresponding to distinct keys by the number of distinct keys to provide the average of the values corresponding to the distinct keys.

67. The non-transitory recording medium of any one of aspects 64-66, wherein the non-transitory recording medium includes instructions, which, when executed by the processor of the server device, cause the server device to select for use in connection with the generation of the distinct key value-record value composite integer a bit depth data type for the distinct key value-record value composite integer which is sufficient to contain a full summation of all the record values to be aggregated.

68. The non-transitory recording medium of aspect 62, wherein the executing includes accessing a collection of aggregation computation instructions;

selecting from the collection of aggregation computation instructions, instructions which, when executed by the processor of the server device, cause the server device to:

examine only the first instance of each given key value; and utilize the record value corresponding to the first instance of the given key value in the distinct aggregation function.

69. The non-transitory recording medium of aspect 62, wherein the executing includes accessing a user-defined library, wherein the user-defined library includes instructions, which, when executed by a processor of the server device, cause the server device to:

examine only the first instance of each given key value; and utilize the record value corresponding to the first instance of the given key value in the distinct aggregation function.

70. In another aspect, the present disclosure provides a method for performing an aggregate function using a database query, the method including:

transmitting a database query over a network connection from a client device to a server device, which, when received by the server device, causes the server device to execute the database query against one or more databases, wherein the database query joins a plurality of database tables and includes a distinct aggregation function, which, when executed against the one or more databases aggregates only values of database records corresponding to distinct keys by which the tables are joined, regardless of the cardinality of the joined tables; and receiving results of the database query at the client device from the server device.

71. The method of aspect 70, wherein the one or more databases are relational databases and the database query is a single Structured Query Language (SQL) query statement.

72. The method of aspect 71, wherein the method includes:

causing the server device to generate a distinct key value-record value composite integer for each record value to be aggregated via the distinct aggregation function, wherein generating the distinct key value-record value composite integer includes:

applying a uniform hash function to covert a key value corresponding to a record value into a random value; and adding the record value to the random value to provide a distinct key value-record value composite integer.

73. The method of aspect 72, wherein the distinct aggregation function is a summation function configured to compute a sum of record values corresponding to distinct keys, and wherein the summation function includes summing the distinct key value-record value composite integers and subtracting the sum of the random values to provide the sum of the record values corresponding to distinct keys.

74. The method of aspect 72, wherein the distinct aggregation function is an average function configured to compute an average of record values corresponding to distinct keys, and wherein the average function includes summing the distinct key value-record value composite integers, subtracting the sum of the random values to obtain the sum of the record values corresponding to distinct keys, and dividing the sum of the record values corresponding to distinct keys by the number of distinct keys to provide the average of the record values corresponding to the distinct keys.

75. The method of any one of aspects 72-74, wherein the server utilizes, in connection with the generation of the distinct key value-record value composite integer, a bit depth data type for the distinct key value-record value composite integer which is sufficient to contain a full summation of all the record values to be aggregated.

76. The method of aspect 70, wherein the executing includes:

accessing a collection of aggregation computation instructions;

selecting from the collection of aggregation computation instructions, instructions which, when executed by the processor of the server device, cause the server device to:

examine only the first instance of each given key value; and utilize the record value corresponding to the first instance of the given key value in the distinct aggregation function.

77. The method of aspect 70, wherein the executing includes accessing a user-defined library, wherein the user-defined library includes instructions, which, when executed by a processor of the server device, cause the server device to:

examine only the first instance of each given key value; and utilize the record value corresponding to the first instance of the given key value in the distinct aggregation function.

78. In another aspect, the present disclosure provides a method for performing an aggregate function using a database query, the method including:

transmitting a query input over a network connection from a client device to a server device, which, when received by the server device, causes the server device to generate a database query based on the query input, wherein the database query joins a plurality of database tables and includes a distinct aggregation function, which, when executed against the one or more databases aggregates only values of database records corresponding to distinct keys by which the tables are joined, regardless of the cardinality of the joined tables, and execute the database query against the one or more databases; and receiving results of the database query at the client device from the server device.

79. The method of aspect 78, wherein the one or more databases are relational databases and the database query is a single Structured Query Language (SQL) query statement.

80. The method of aspect 79, wherein the method includes:

causing the server device to generate a distinct key value-record value composite integer for each record value to be aggregated via the distinct aggregation function, wherein generating the distinct key value-record value composite integer includes:

applying a uniform hash function to covert a key value corresponding to a record value into a random value; and adding the record value to the random value to provide a distinct key value-record value composite integer.

81. The method of aspect 80, wherein the distinct aggregation function is a summation function configured to compute a sum of record values corresponding to distinct keys, and wherein the summation function includes summing the distinct key value-record value composite integers and subtracting the sum of the random values to provide the sum of the record values corresponding to distinct keys.

82. The method of aspect 80, wherein the distinct aggregation function is an average function configured to compute an average of record values corresponding to distinct keys, and wherein the average function includes summing the distinct key value-record value composite integers, subtracting the sum of the random values to obtain the sum of the record values corresponding to distinct keys, and dividing the sum of the record values corresponding to distinct keys by the number of distinct keys to provide the average of the record values corresponding to the distinct keys.

83. The method of any one of aspects 80-82, wherein the server utilizes, in connection with the generation of the distinct key value-record value composite integer, a bit depth data type for the distinct key value-record value composite integer which is sufficient to contain a full summation of all the record values to be aggregated.

84. The method of aspect 78, wherein the executing includes:

accessing a collection of aggregation computation instructions;

selecting from the collection of aggregation computation instructions, instructions which, when executed by the processor of the server device, cause the server device to:

examine only the first instance of each given key value; and utilize the record value corresponding to the first instance of the given key value in the distinct aggregation function.

85. The method of aspect 78, wherein the executing includes accessing a user-defined library, wherein the user-defined library includes instructions, which, when executed by a processor of the server device, cause the server device to:

examine only the first instance of each given key value; and utilize the record value corresponding to the first instance of the given key value in the distinct aggregation function.

86. In another aspect, the present disclosure provides a system for performing an aggregate function using a database query, the system including:

a client device;

a server device; and one or more databases, wherein the client device transmits a database query over a network connection from the client device to the server device, which, when received by the server device, causes the server device to execute a database query against the one or more databases, wherein the database query joins a plurality of database tables and includes a distinct aggregation function, which, when executed against the one or more databases aggregates only values of database records corresponding to distinct keys by which the tables are joined, regardless of the cardinality of the joined tables, and wherein the server device returns results of the database query to the client device over a network connection.

DETAILED DESCRIPTION

Figure 1:
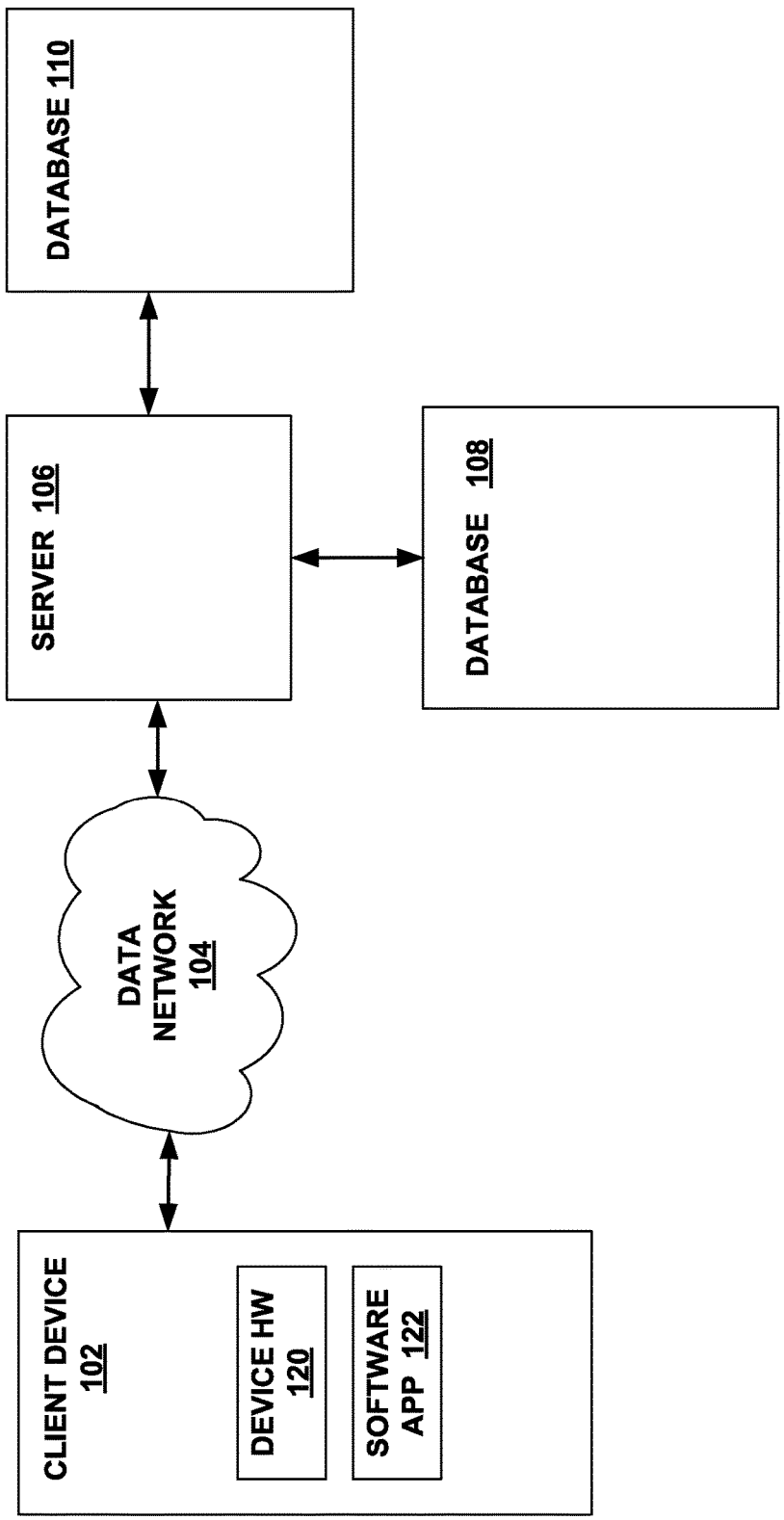
FIG. 1 is a block diagram of an example system for querying one or more databases, according to an example embodiment.

As discussed above, RAA is a method of computing aggregate functions on data sets that avoids the inefficiencies needed to accurately calculate aggregate functions on joined normalized data while still maintaining the flexibility of a pure normalized database. The present disclosure provides methods for performing an aggregate function using a database query, wherein the database query joins a plurality of database tables and includes a distinct aggregation function, which, when executed against one or more databases aggregates only values of database records corresponding to distinct keys by which the tables are joined, regardless of the cardinality of the joined tables.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs.

Any and all publications mentioned herein are incorporated herein by reference to disclose and describe the methods and/or materials in connection with which the publications are cited. It is understood that the present disclosure supersedes any disclosure of an incorporated publication to the extent there is a contradiction. Further, the dates of any such publications provided may be different from the actual publication dates which may need to be independently confirmed.

It must be noted that as used herein and in the appended claims, the singular forms "a", "an", and "the" include plural referents unless the context clearly dictates otherwise. Thus, for example, reference to "a database" includes a plurality of such databases, and so forth.

It is further noted that the claims may be drafted to exclude any element, e.g., any optional element. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Although any methods and materials similar or equivalent to those described herein can be used in the practice of the present invention, some potential and exemplary methods and materials are now described.

An example of the inefficiencies addressed via RAA is provided below with reference to Tables 1 and 2. An extremely common pattern in database architecture is to have a first table of entities and a second table which describes the activities of those entities. Information unique to the entities is kept distinct from information unique to the activities. Queries about the activities can join in the entity table to get information about the entities performing the activities. For example, Table 1 below provides a simple table including data for a set of users. Table 2 below provides a table including a set of orders that users identified in Table 1 have placed.

TABLE 1

| user_id | user_name | age | state |
| --- | --- | --- | --- |
| 1 | Marcus | 23 | CA |
| 2 | Andrea | 34 | NV |
| 3 | Shimrod | 45 | NV |
| 4 | Laura | 56 | NV |

TABLE 2

| order_id | user_id | order_amount |
| --- | --- | --- |
| 1 | 3 | 20 |
| 2 | 3 | 30 |

TABLE 2-continued

| order_id | user_id | order_amount |
|---|---|---|
| 3 | 3 | 20 |
| 4 | 1 | 100 |
| 5 | 2 | 1000 |
| 6 | 2 | 20 |
| 7 | 3 | 50 |

An exemplary question that a user might ask of a database containing the above tables is: "What is the average age of a customer who has placed an order?" With this small data set, the answer can be picked out and computed by simply looking at the tables. Marcus, Andrea and Shimrod have all ordered, so the average age is the sum of their ages, divided by three, (23+34+45)/3, or 34. However, writing the SQL query for this computation is more complex. A first attempt at answering the above question might utilize the following query using the aggregation function "AVG( )" in SQL:

```
SELECT AVG(users.age) AS average_age_of_purchaser
FROM orders
LEFT JOIN users ON orders.user_id = users.user_id
```

The above calculation will sum the age of the user who made each order, and divide that by the number of orders, or (45+45+45+23+34+34+45)/7, which results in an answer of approximately 38.7. This is the answer to a different question, such as "What is the average age of a customer that one should expect when answering the phone to take an order?" The answer to this question, while potentially interesting, is not the answer to the question that was originally posed.

In order to use the AVG function in SQL in the above context, the average must be run on a dataset with the same number of rows as the number of unique users who have ordered. This calculation requires two queries, a first query to summarize by user all of the order activity, and a second query to compute the average. In SQL-99 this can be written using a "WITH" expression to combine the two calculations.

```
WITH user_order_activity AS (
    SELECT user_id, age, COUNT(*) as order_count
    FROM ORDERS
    GROUP BY user_id)
SELECT AVG(users.age) as average_age_of_purchaser
FROM user_order_activity
LEFT JOIN users ON user_order_activity.user_id =
users.user_id
```

Using a second nested query will produce the correct result, however, in order to handle queries about more complex orders, for example if an order could include many order items, or if a user could have multiple shipping addresses, the number of these intermediate calculations needed to answer questions about orders quickly becomes quite large and a single query very often will require several of these sub-queries. Accordingly, this approach represents an inefficient means of obtaining the desired information.

The RAA method described herein represents an improved approach, which does not suffer from the inefficiencies described above. RAA is a method for computing the aggregation of a number by using knowledge of how that number was joined into the query to express a computation of the aggregation which avoids the unexpected results from joining tables of different cardinality, and the inefficiency of having to create an intermediate table. For example, in one aspect, RAA provides a solution to the problem which arises when a standard aggregation technique results in an aggregate value which is skewed relative to an expected value due to the presence of more than one instance of the primary key in the tables being queried.

This concept is an extension of the notion in SQL of a "distinct value". There currently exists in SQL a computation COUNT(DISTINCT( )) meaning "count unique values of this expression across the current data set" which you can use to properly count items across an aggregation. A similar expression, albeit less generally useful, is SUM (DISTINCT( )), which computes all the unique values of an expression and then sums them.

RAA may be characterized as a method for aggregating values for records with distinct keys. With RAA the problem query above could be written simply and efficiently as:

```
SELECT
    AVG_DISTINCT(users.age,users.user_id) AS average_age
FROM orders
LEFT JOIN users ON orders.user_id = users.user_id
```

The RAA technique is to ask for an aggregation across a distinct key, which is not the value being used in the aggregation calculation, but rather is the key used to correlate the separate data sets into the single data set for the computation.

The simple example above could also have been written without RAA using the GROUP BY keyword in SQL to compute the distinction across the correlation as in:

```
SELECT
    AVG(users.age) AS average_age
FROM orders
LEFT JOIN users ON orders.user_id = users.user_id
GROUP by users.user_id
```

However in a query with multiple columns, it is not possible to GROUP BY differently for each value to produce a correct aggregation calculation for each column in the result set. For example, if the list of items in the order was also joined on the order_id, it would be impossible to both group by user_id to get the correct aggregation for computations about the user and order_id to correctly aggregate on the order. RAA allows each aggregation to be performed with the correct grouping, in one efficient query, even if several different tables are being joined to gather enough data to compute the results.

This technique of selecting distinct values for aggregation across a correlation key can be applied to extend the usefulness of a variety of aggregation functions, such as these which are typically provided by a database engine: average, collect, correlation, covariance, density, median, rank, percentile, standard deviation and variance.

SQL Implementation

An implementation of RAA exists which can be expressed in SQL for the operations SUM_DISTINCT and AVG_DISTINCT. This implementation uses a fixed length integer arithmetic (e.g., a 128-bit arithmetic) to convert the knowledge of the key value and corresponding record value to a new value, e.g., a 128 bit value, in such a way that the resulting set of values actually are distinct by key and not just by raw value. This allows the use of the built-in SUM(DISTINCT( )) of the underlying SQL engine to be used to apply DISTINCT with the correct semantics, i.e. on the key in question and not on the raw value of the column being summed. The implementation uses a uniform hash to convert the key value into a random value, and then addition to encode the record value into the hash for purposes of distinct key value-record value computation. Subtraction is then utilized to remove the hash from the composite value when the aggregate total is required.

Assuming the existence of a uniform hash function (which exists, but generally has a different name in every SQL dialect) "HASH", the pseudo SQL to compute the sum of distinct values for an expression V across a join which uses the key K looks like this:

SUM(DISTINCT(HASH(K)+V))−SUM(DISTINCT (HASH(K)))

And the computation for average V across a join on K would follow as:

SUM(DISTINCT(HASH(K)+V)) − SUM(DISTINCT(HASH(K))) / COUNT(DISTINCT(K))

If the value being aggregated is not an integer, it would need to be converted into an integer in order to be encoded in the composite key value, and then converted back after the computation, this may require additional information about the range of values and precision needed in those values.

For a SQL implementation with 256 bit integers, this implementation can be used without any concern of overflow. However, using 128 bit implementations, computing a composite value from a hash requires some advance knowledge about the dataset, about the range of values possible, and the number of distinct values in the dataset. When a database server does not provide a native implementation, this will, for many uses, be equivalent to the native implementation in terms of accuracy.

Using 128 bit implementation, the number of bits generated by the hash function are restricted, in essence creating a uniform hash function h(K,N) which can map a key into an N bit space. It is desirable to allocate as many bits to N as possible to minimize the probability of collisions. In a data set with A distinct values, it may be necessary to sum the hash value A times, which means a maximum sum would be $A \times 2^N$. Thus when choosing N, it should be equal to the maximum number of bits for computations (128 in this example) minus $\log_2(A)$.

Once an N has been chosen, the probability of a collision can be computed as $$1 - e^{-\frac{A^2}{2^{N+1}}}$$

As an example of how an SQL implementation would select an N, the formula above can be used to create the following "C" program to calculate the probability of a collision for sets of a given size, also determining whether such a set would overflow the remaining bits that would be used to sum the results:

```
#include <cmath>
#include <cstdlib>
#include <iostream>
void agg_prob(long agg_size, long hashbits) {
    long numbits = 128− hashbits;
    double probability = 1.0 − exp ( − (pow(agg_size,2)/(2*pow(2, hashbits))));
    long l = long(1/probability);
    double max_agg_size = pow(2, numbits);
    if (agg_size > max_agg_size) {
        std::cout << "Overflow, ";
    } else {
        if (l > 0) {
            std::cout << "1 in " << long(1/probability) << ", ";
        } else {
            std::cout << "1 in " << 1/probability << ", ";
        }
    }
}
int main(int argc, char ** argv) {
    long hashbits;
    std::cout << "Hash Bits, Overflow Size, 1000, 1M, 500M, 1B, 10B, 100B, 1T, 10T,\n";
    for (hashbits = 85; hashbits <= 100; hashbits++) {
        double max_agg_size = pow(2, 128 − hashbits);
        std::cout << hashbits << ", " << long(max_agg_size) << " , ";
        agg_prob(1000L, hashbits);
        agg_prob(1000000L, hashbits);
        agg_prob(500000000L, hashbits);
        agg_prob(1000000000L, hashbits);
        agg_prob(10000000000L, hashbits);
        agg_prob(100000000000L, hashbits);
        agg_prob(1000000000000L, hashbits);
        agg_prob(10000000000000L, hashbits);
        std::cout << std::endl;
    }
    return 0;
}
```

Table 3 below was generated using the above program, which shows the relationships between likelihood of a collision and the number of bits allocated to the hash space. An implementation in SQL can use this information to choose an N appropriate for the data being queried.

TABLE 3

| Hash Bits | Overflow Size | 1000 | 1M | 500M |
|---|---|---|---|---|
| 85 | 8796093022208 | 1 in inf | 1 in 77648269437422 | 1 in 309485014 |
| 86 | 4398046511104 | 1 in inf | 1 in 155296538874844 | 1 in 618970029 |
| 87 | 2199023255552 | 1 in inf | 1 in 310593077749689 | 1 in 1237939973 |
| 88 | 1099511627776 | 1 in inf | 1 in 600479950316066 | 1 in 2475879947 |
| 89 | 549755813888 | 1 in inf | 1 in 1286742750677284 | 1 in 4951761255 |
| 90 | 274877906944 | 1 in inf | 1 in 2251799813685248 | 1 in 9903517066 |
| 91 | 137438953472 | 1 in inf | 1 in 4503599627370496 | 1 in 19807055911 |
| 92 | 68719476736 | 1 in inf | 1 in 9007199254740992 | 1 in 39614024711 |
| 93 | 34359738368 | 1 in inf | 1 in inf | 1 in 79228049422 |
| 94 | 17179869184 | 1 in inf | 1 in inf | 1 in 158457492650 |

TABLE 3-continued

| | | | | | |
|---|---|---|---|---|---|
| 95 | 8589934592 | 1 in inf | 1 in inf | | 1 in 316909410130 |
| 96 | 4294967296 | 1 in inf | 1 in inf | | 1 in 633818820261 |
| 97 | 2147483648 | 1 in inf | 1 in inf | | 1 in 1267726847957 |
| 98 | 1073741824 | 1 in inf | 1 in inf | | 1 in 2535096891286 |
| 99 | 536870912 | 1 in inf | 1 in inf | | 1 in 5071621201993 |
| 100 | 268435456 | 1 in inf | 1 in inf | | Overflow |

| Hash Bits | 1B | 10B | 100B | 1T | 10T |
|---|---|---|---|---|---|
| 85 | 1 in 77371253 | 1 in 773713 | 1 in 7737 | 1 in 77 | Overflow |
| 86 | 1 in 154742504 | 1 in 1547425 | 1 in 15474 | 1 in 155 | Overflow |
| 87 | 1 in 309485014 | 1 in 3094850 | 1 in 30949 | 1 in 309 | Overflow |
| 88 | 1 in 618970029 | 1 in 6189700 | 1 in 61897 | 1 in 619 | Overflow |
| 89 | 1 in 1237939973 | 1 in 12379400 | 1 in 123794 | Overflow | Overflow |
| 90 | 1 in 2475879947 | 1 in 24758801 | 1 in 247588 | Overflow | Overflow |
| 91 | 1 in 4951761255 | 1 in 49517601 | 1 in 495176 | Overflow | Overflow |
| 92 | 1 in 9903517066 | 1 in 99035203 | Overflow | Overflow | Overflow |
| 93 | 1 in 19807055911 | 1 in 198070406 | Overflow | Overflow | Overflow |
| 94 | 1 in 39614024711 | 1 in 396140804 | Overflow | Overflow | Overflow |
| 95 | 1 in 79228049422 | Overflow | Overflow | Overflow | Overflow |
| 96 | 1 in 158457492650 | Overflow | Overflow | Overflow | Overflow |
| 97 | 1 in 316909410130 | Overflow | Overflow | Overflow | Overflow |
| 98 | 1 in 633818820261 | Overflow | Overflow | Overflow | Overflow |
| 99 | Overflow | Overflow | Overflow | Overflow | Overflow |
| 100 | Overflow | Overflow | Overflow | Overflow | Overflow |

Native Implementation

A native implementation of RAA will have access to the full dataset being queried and be able to perform accurate selection of distinct values for aggregation across a wide variety of aggregate functions without having to resort to the construction of a composite value as described above for the SQL implementation. A native implementation is thus simpler in theory than the SQL implementation.

The details of a specific native implementation will vary, as each native implementation will be provided as an extension to an existing database engine, and so will have access to the data through methods which will be unique to each database engine. However the general technique for implementing RAA will be the same in each instance. Generally, such an implementation includes a process by which a processor, e.g., a processor of a database engine, accesses a collection of aggregation computation instructions and selects from the collection of aggregation computation instructions, instructions which, when executed by the processor, cause the processor to examine only the first instance of each given key value, and utilize the record value corresponding to the first instance of the given key value in the distinct aggregation function. Where the processor is a processor of a database engine, the collection of aggregation computation instructions may be provided to the database engine by a client device. In another embodiment, the collection of aggregation computation instructions is loaded as source or compiled code by the database engine. In yet another embodiment, the collection of aggregation computation instructions is combined along with other instructions in the construction of the database engine.

In some embodiments, such an implementation includes a process by which a server device accesses a user-defined library, wherein the user-defined library includes instructions, which, when executed by a processor of the server device, cause the server device to examine only the first instance of a given key value, and utilize the record value corresponding to the first instance of the given key value in the distinct aggregation function.

The specific steps involved in the examination and utilization will vary, e.g., depending on the particular aggregation function being performed. The collection of aggregation computation instructions, e.g., the user-defined library, described above may be stored in database memory or any other suitable location which may be accessed by a suitable processor, e.g., a processor of a database engine and/or a processor of a server device.

For example, in one open source database engine, to provide a function for "variance" and other aggregations, a single shared library was constructed for the target platform that implements the following functions for each aggregate function to be loaded by SQL statements such as:

CREATE AGGREGATE FUNCTION variance_distinct_on_key
RETURNS REAL SONAME "lib_raa.so";

The following functions were added to the shared library:

```
my_bool variance_distinct_on_key_init(
    UDF_INIT* initid, UDF_ARGS* args, char* message );
void variance_distinct_on_key_deinit(
    UDF_INIT* initid );
void variance_distinct_on_key_reset(
    UDF_INIT* initid, UDF_ARGS* args, char* is_null, char
*error );
void variance_distinct_on_key_clear(
    UDF_INIT* initid, char* is_null, char *error );
void variance_distinct_on_key_add(
    UDF_INIT* initid, UDF_ARGS* args, char* is_null, char
*error );
double variance_distinct_on_key(
    UDF_INIT* initid, UDF_ARGS* args, char* is_null, char
*error );
```

The important function here is variance_distinct_on_key_add, which, for each row in the result set, it will be passed the value of the primary key for the DISTINCT and the value of the field to be aggregated.

The first time it encounters a row with a given value of the primary key, it adds a new element to the data structure representing the aggregate; this element has both the value of the primary key and the value of the field stored in it.

For each subsequent row with the same value of the primary key, if the value of the field to be aggregated is the same, it is ignored. If this value is different for the same value of the primary key, an error is flagged.

The variance_distinct_on_key will actually compute and return the variance based on the stored values in the aggregate data structure, and the deinit function will free any resources associated with storing the aggregate data structure.

Certain types of aggregation will lend themselves to optimization of this process, for example sum_distinct_on_key can maintain a running sum and does not need to store the whole aggregate data structure.

Methods, Systems and Devices

Exemplary methods, systems and devices of the present disclosure are now described with reference to the Figures.

FIG. 1 is a block diagram of an example system for querying one or more databases, according to an example embodiment. The system includes a client device 102, a data network 104, one or more servers 106, and databases 108 and 110.

The client device 102 can be any type of computing device, including a personal computer, laptop computer, mobile phone with computing capabilities, or any other type of device. The client device 102 includes, among other things, device hardware 120, a software application 122, other application(s), a communications client, output devices (e.g., a display), and input devices (e.g., keyboard, mouse, touch screen), etc. In some embodiments, a client device 102 may act as both an output device and an input device.

Device hardware 120 includes physical computer components, such as a processor and memory. The software application 122 is configured to receive input for querying the one or more databases 108, 110. According to various embodiments, the software application 122 can be implemented in the OS (operating system) of the client device 102 or as a stand-alone application installed on the client device 102. In one embodiment, the software application 122 is a web browser application.

The data network 104 can be any type of communications network, including an Internet network (e.g., wide area network (WAN) or local area network (LAN)), wired or wireless network, or mobile phone data network, among others.

The client device 102 is configured to communicate with a server 106 via the data network 104. The server 106 includes a software application executed by a processor that is configured to generate a query against the databases 108, 110 based on an input received from the client device 102. The server 106 is in communication with databases 108 and 110. The databases 108, 110 are configured to store data. The databases 108, 110 can be any type of database, including relational databases, non-relational databases, file-based databases, and/or non-file-based databases, among others.

Figure 2:
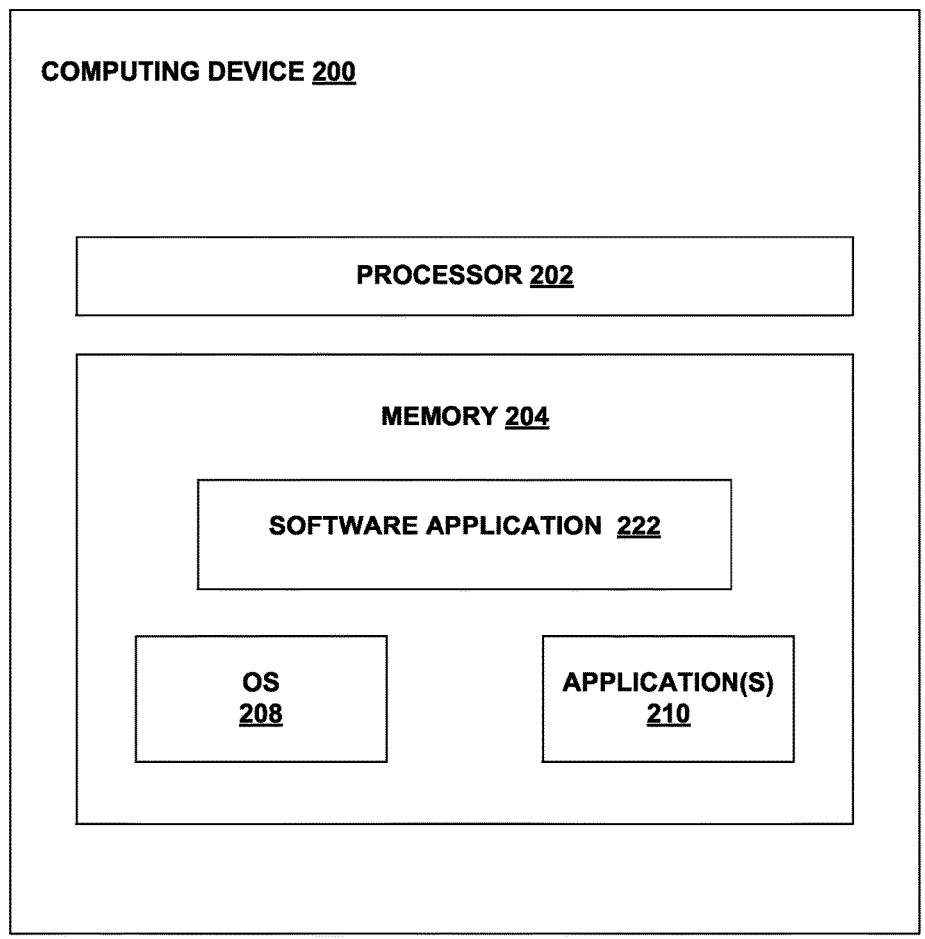
FIG. 2 is a block diagram of the arrangement of components of a computing device configured to query one or more databases, according to an example embodiment.

FIG. 2 is a block diagram of the arrangement of components of a computing device 200 configured to query one or more databases, according to an example embodiment. As shown, computing device 200 includes a processor 202 and memory 204, among other components (not shown). In one embodiment, the computing device 200 comprises the client device 102. In another embodiment, the computing device 200 comprises the server 106.

The memory 204 includes various applications that are executed by processor 202, including installed applications 210, an operating system 208, and software application 222. In embodiments where the computing device 200 comprises the client device 102, the software application 222 comprises a web browser application. In embodiments where the computing device 200 comprises the server 106, the software application 222 comprises a software application configured to receive and execute a database query and/or receive a query input, generate a database query based on the query input, and execute the database query.

Figure 3:
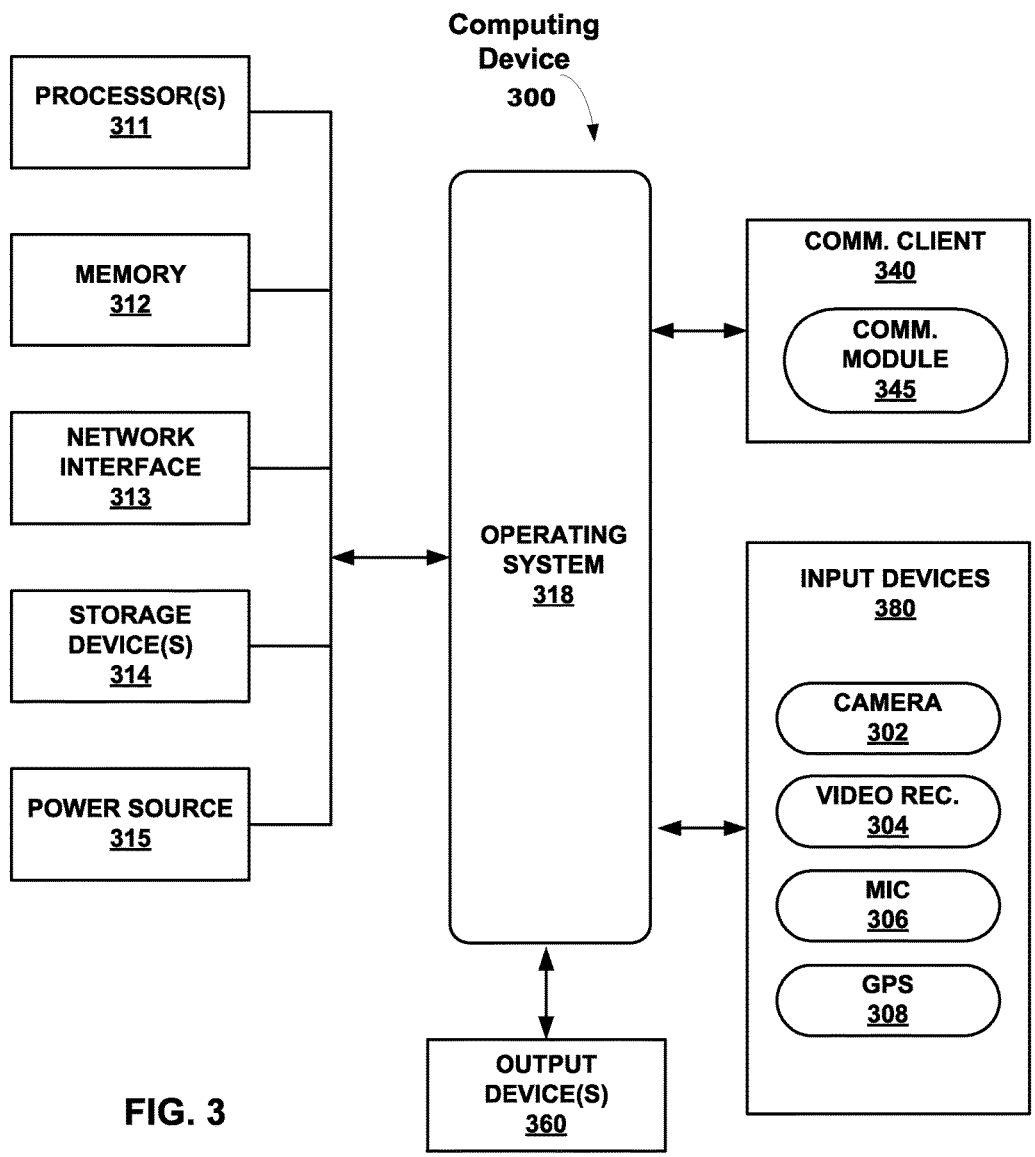
FIG. 3 is a block diagram of example functional components for a computing device, according to one embodiment.

FIG. 3 is a block diagram of example functional components for a computing device 300, according to one embodiment. One particular example of computing device 300 is illustrated. Many other embodiments of the computing device 300 may be used. In one embodiment, the computing device 300 comprises the client device 102. In another embodiment, the computing device 300 comprises the server 106.

In the illustrated embodiment of FIG. 3, the computing device 300 includes one or more processor(s) 311, memory 312, a network interface 313, one or more storage devices 314, a power source 315, output device(s) 360, and input device(s) 380. The computing device 300 also includes an operating system 318 and a communications client 340. Each of components 311, 312, 313, 314, 315, 360, 380, 318, and 340 is interconnected physically, communicatively, and/or or operatively for inter-component communications in any operative manner.

As illustrated, processor(s) 311 are configured to implement functionality and/or process instructions for execution within computing device 300. For example, processor(s) 311 execute instructions stored in memory 312 or instructions stored on storage devices 314. Memory 312, which may be a non-transient, computer-readable storage medium, is configured to store information within computing device 300 during operation. In some embodiments, memory 312 includes a temporary memory, area for information not to be maintained when the computing device 300 is turned OFF. Examples of such temporary memory include volatile memories such as random access memories (RAM), dynamic random access memories (DRAM), and static random access memories (SRAM). Memory 312 maintains program instructions for execution by the processor(s) 311.

Storage devices 314 also include one or more non-transient computer-readable storage media. Storage devices 314 are generally configured to store larger amounts of information than memory 312. Storage devices 314 may further be configured for long-term storage of information. In some examples, storage devices 314 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 300 uses network interface 313 to communicate with external devices via one or more networks, such as server 106 and/or database 108, 110 shown in FIG. 1. Network interface 313 may be a network interface card, such as an Ethernet card, an optical transceiver, a radio frequency transceiver, or any other type of device that can send and receive information. Other non-limiting examples of network interfaces include wireless network interfaces, e.g., Bluetooth®, 4G and WiFi® radios in mobile computing devices, and USB (Universal Serial Bus). In some embodiments, the computing device 300 uses network interface 313 to wirelessly communicate with an external device, a mobile phone of another, or other networked computing device.

Wireless networks as described herein may include, but are not limited to, Code Divisional Multiple Access (CDMA) networks, the Group Special Mobile or the Global System for Mobile Communications (GSM) and the General Packet Radio Service (GPRS) networks, third-generation (3G) networks such as Enhanced Data-rates for Global Evolution (EDGE) and Universal Mobile Telecommunications Systems (UMTS), fourth-generation (4G) networks such as Mobile WiMax and Long Term Evolution (LTE), International Mobile Telecommunications-Advanced (IMT-Advanced) networks, and future fifth-generation (5G) networks exceeding the capabilities of the current 4G/IMT-Advanced standards. Examples of wireless networks include, for example, a BLUETOOTH network, a wireless personal area network, a wireless 802.11 local area network (LAN), and/or wireless telephony network (e.g., a cellular, PCS, or GSM network).

The computing device 300 includes one or more input devices 380. Input devices 380 are configured to receive input from a user through tactile, audio, video, or other sensing feedback. Non-limiting examples of input devices 380 include a presence-sensitive screen, a mouse, a keyboard, a voice responsive system, camera 302, a video recorder 304, a microphone 306, a GPS module 308, or any other type of device for detecting a command from a user or sensing the environment. In some examples, a presence-sensitive screen includes a touch-sensitive screen.

One or more output devices 360 are also included in computing device 300. Output devices 360 are configured to provide output to a user using tactile, audio, and/or video stimuli. Output devices 360 may include a display screen (part of the presence-sensitive screen), a sound card, a video graphics adapter card, or any other type of device for converting a signal into an appropriate form understandable to humans or machines. Additional examples of output device 360 include a speaker, a cathode ray tube (CRT) monitor, a liquid crystal display (LCD), or any other type of device that can generate intelligible output to a user. In some embodiments, a device may act as both an input device and an output device.

The computing device 300 includes one or more power sources 315 to provide power to the computing device 300. Non-limiting examples of power source 315 include single-use power sources, rechargeable power sources, and/or power sources developed from nickel-cadmium, lithium-ion, or other suitable material. The computing device 300 includes an operating system 318, such as a Windows®, Apple® OS, iOS®, or Android® operating system. The operating system 318 controls operations of the components of the computing device 300. For example, the operating system 318 facilitates the interaction of communications client 340 with processors 311, memory 312, network interface 313, storage device(s) 314, input device 380, output device 360, and power source 315.

As also illustrated in FIG. 3, the computing device 300 includes communications client 340. Communications client 340 includes communications module 345. Each of communications client 340 and communications module 345 includes program instructions and/or data that are executable by the computing device 300. For example, in one embodiment, communications module 345 includes instructions causing the communications client 340 executing on the computing device 300 to perform one or more of the operations and actions described in the present disclosure. In some embodiments, communications client 340 and/or communications module 345 form a part of operating system 318 executing on the computing device 300.

As described in greater detail herein, one or more embodiments of the disclosure provide methods and related systems for performing an aggregate function using a database query. For example, in some embodiments, the present disclosure provides a method for performing an aggregate function using a database query, wherein the method includes receiving a database query at a server 106, wherein the database query joins a plurality of database tables, e.g., database tables of database 108, 110, and comprises a distinct aggregation function, which, when executed against one or more databases 108, 110 aggregates only values of database records corresponding to distinct keys by which the tables are joined, regardless of the cardinality of the joined tables. The server 106 then executes the database query against the one or more databases 108, 110, and provides results of the database query to a client device 102 over a data network 104. As described above, the client device 102 may be a first computing device 200 or a component thereof. Alternatively, or in addition, a second computing device 200 includes the server 106. Similarly, the client device 102 may be a first computing device 300, or a component thereof, as described herein. Alternatively, or in addition, a second computing device 300 includes the server 106.

The one or more databases 108, 110 can be relational databases. In some embodiments, the database query is a SQL query. In some such embodiments, methods according to the present disclosure include steps of generating a distinct key value-record value composite integer for each record value to be aggregated via the distinct aggregation function, wherein generating the distinct key value-record value composite integer includes applying a uniform hash function to covert a key value corresponding to a record value into a random value, and adding the record value to the random value to provide a distinct key value-record value composite integer.

Where the distinct aggregation function is a summation function configured to compute a sum of record values corresponding to distinct keys, the summation function can include steps of summing the distinct key value-record value composite integers and subtracting the sum of the random values to provide the sum of the record values corresponding to distinct keys.

Where the distinct aggregation function is an average function configured to compute an average of record values corresponding to distinct keys, the average function can include summing the distinct key value-record value composite integers, subtracting the sum of the random values to obtain the sum of the record values corresponding to distinct keys, and dividing the sum of the record values corresponding to distinct keys by the number of distinct keys to provide the average of the record values corresponding to the distinct keys.

For methods involving the generation of a distinct key value-record value composite integer as described above, a bit depth data type for the distinct key value-record value composite integer should generally be utilized which is sufficient to contain a full summation of all the record values to be aggregated. As discussed previously herein, when implementing RAA in a device with constrained precision, such as an database server with only 128 bits of arithmetic precision), some advance knowledge about the dataset, about the range of values possible, and the number of distinct values in the dataset may be necessary to avoid collisions.

In other embodiments, the present disclosure provides a method for performing an aggregate function using a database query, wherein the method includes receiving, at a server 106, a query input from a client device 102 over a data network 104. The server 106 then generates a database query based on the query input, wherein the database query joins a plurality of database tables, e.g., database tables of database 108, 110, and includes a distinct aggregation function, which, when executed against one or more databases 108, 110 aggregates only values of database records corresponding to distinct keys by which the tables are joined, regardless of the cardinality of the joined tables. The server 106 then executes the database query against the one or more databases 108, 110, and returns results of the database query to the client device 102 over the data network 104.

As described above, the client device 102 may be a first computing device 200 or a component thereof. Alternatively, or in addition, a second computing device 200 includes the server 106. Similarly, the client device 102 may be a first computing device 300, or a component thereof, as described herein. Alternatively, or in addition, a second computing device 300 includes the server 106.

The one or more databases 108, 110 can be relational databases. In some embodiments, the database query is a SQL query. In some such embodiments, methods according to the present disclosure include steps of generating a distinct key value-record value composite integer for each record value to be aggregated via the distinct aggregation function, wherein generating the distinct key value-record value composite integer includes applying a uniform hash function to covert a key value corresponding to a record value into a random value, and adding the record value to the random value to provide a distinct key value-record value composite integer.

Where the distinct aggregation function is a summation function configured to compute a sum of record values corresponding to distinct keys, the summation function can include the steps of summing the distinct key value-record value composite integers and subtracting the sum of the random values to provide the sum of the record values corresponding to distinct keys.

Where the distinct aggregation function is an average function configured to compute an average of record values corresponding to distinct keys, the average function can include summing the distinct key value-record value composite integers, subtracting the sum of the random values to obtain the sum of the record values corresponding to distinct keys, and dividing the sum of the record values corresponding to distinct keys by the number of distinct keys to provide the average of the record values corresponding to the distinct keys.

For methods involving the generation of a distinct key value-record value composite integer as described above, a bit depth data type for the distinct key value-record value composite integer should generally be utilized which is sufficient to contain a full summation of all the values to be aggregated. As discussed previously herein, when using a 128 bit implementation, some advance knowledge about the dataset, about the range of values possible, and the number of distinct values in the dataset may be necessary to avoid collisions.

As discussed above, in some embodiments, the present disclosure provides a method for performing an aggregate function using a database query, wherein the method includes receiving a database query at a server 106, wherein the database query joins a plurality of database tables, e.g., database tables of database 108, 110, and comprises a distinct aggregation function, which, when executed against one or more databases 108, 110 aggregates only values of database records corresponding to distinct keys by which the tables are joined, regardless of the cardinality of the joined tables. The server 106 then executes the database query against the one or more databases 108, 110, and provides results of the database query to a client device 102 over a data network 104.

The step of executing the database query against the one or more databases 108, 110 includes, in some embodiments, accessing a collection of aggregation computation instructions and selecting from the collection of aggregation computation instructions, instructions which, when executed by the server 106, cause the server 106 to examine only the first instance of each given key value and utilize the record value corresponding to the first instance of the given key value in the distinct aggregation function. In some embodiments, this includes accessing a user-defined library, wherein the user-defined library comprises instructions, which, when executed by a processor associated with the server 106, cause the server 106 to examine only the first instance of each given key value, and utilize the record value corresponding to the first instance of a given key value in the distinct aggregation function. In some embodiments, this may include providing a data structure including only the first instance of each given key value and its corresponding record value to be aggregated. In such embodiments, the server may then aggregate the record values of the data structure. The processor associated with the server 106 may be, e.g., a processor 202 or 311 of computing device 200 or 300 respectively.

As described above, the client device 102 may be a first computing device 200 or a component thereof. Alternatively, or in addition, a second computing device 200 includes the server 106. Similarly, the client device 102 may be a first computing device 300, or a component thereof, as described herein. Alternatively, or in addition, a second computing device 300 includes the server 106.

The user-defined library described above may be stored in database memory, e.g., database memory of one or more databases 108, 110 or any other suitable location which may be accessed by the server 106.

In connection with the above, in some embodiments, the present disclosure provides a method for facilitating the performance an aggregate function using a database query, wherein the database query joins a plurality of database tables, e.g., database tables of databases 108, 110, and comprises a distinct aggregation function, which, when executed against one or more databases 108, 110 aggregates only values of database records corresponding to distinct keys by which the tables are joined, regardless of the cardinality of the joined tables, and wherein the method includes providing a collection of aggregation computation instructions, e.g., a user-defined library, accessible to a server 106, wherein the collection of aggregation computation instructions, e.g., the user-defined library, comprises instructions, which, when executed by a processor associated with the server 106, cause the server 106 to examine only the first instance of each given key value, and utilize the record value corresponding to the first instance of a given key value in the distinct aggregation function. In some embodiments, this may include providing a data structure including only the first instance of each given key value and its corresponding record value to be aggregated. In such embodiments, the server may then aggregate the record values of the data structure.

As discussed above, in some such embodiments, methods according to the present disclosure include steps of generating a distinct key value-record value composite integer for each record value to be aggregated via the distinct aggregation function. Accordingly, in some embodiments, the present disclosure provides a method for generating a distinct key value-record value composite integer for use in an aggregation, wherein the method includes: applying a uniform hash function to covert a key value corresponding to a record value into a random value, and adding the record value to the random value to provide a distinct key value-record value composite integer, wherein the applying and adding are performed by a processor associated with a server 106, e.g., a processor 202 or 311 as described herein. In some embodiments, such a method will include the selection of a bit depth data type for the distinct key value-record value composite integer which is sufficient to contain a full summation of all the values to be aggregated.

The above methods can also be described from the point of view of the client device 102. For example, in some embodiments, the present disclosure provides a method which includes steps of transmitting a database query over a data network 104 from a client device 102 to a server 106, which, when received by the server 106, causes the server 106 to execute the database query against one or more databases 108, 110, wherein the database query joins a plurality of database tables, e.g., a plurality of database tables of database 108, 110, and comprises a distinct aggregation function, which, when executed against the one or more databases 108, 110 aggregates only values of database records corresponding to distinct keys by which the tables are joined, regardless of the cardinality of the joined tables. The method further includes a step of receiving results of the database query at the client device 102 from the server 106.

Similarly, in some embodiments, the present disclosure provides a method which includes steps of transmitting a query input over a data network 104 from a client device 102 to a server 106, which, when received by the server 106, causes the server 106 to generate a database query based on the query input, wherein the database query joins a plurality of database tables and comprises a distinct aggregation function, which, when executed against the one or more databases aggregates only values of database records corresponding to distinct keys by which the tables are joined, regardless of the cardinality of the joined tables, and execute the database query against the one or more databases. The method further includes a step of receiving results of the database query at the client device 102 from the server 106.

Instructions implementing one or more of the various steps of the methods described herein may be embodied in any suitable non-transitory recording medium known in the art and/or described herein.

In some embodiments, one or more of the various steps of the methods described herein may be performed by one or more software applications, e.g., software applications designed to run on a computing device as described herein and/or stored on a non-transient, computer-readable storage medium as described herein. In some embodiments, the one or more software applications are provided with or configured to access metadata associated with one or more databases as described herein, e.g., metadata describing the schema of the one or more databases. In some embodiments, metadata associated with the one or more databases is utilized in the formation and/or execution of a database query including a distinct aggregation function as described herein. For example, in some embodiments, a particular distinct aggregation function is selected and/or implemented, e.g., in response to a question posed by a user, based on metadata associated with the one or more databases. Such metadata may include, e.g., information regarding the structure and/or relationship of tables within the one or more databases.

It will also be appreciated that the present disclosure provides systems and subsystems which incorporate a plurality of the individual components describe herein in a functional relationship. For example, in some embodiments, a system of the present disclosure includes a client device 102, a server 106 (including, e.g., server hardware, e.g., one or more associated processors), and one or more databases 108, 110, wherein the client device 102 transmits a database query over a data network 104 from the client device 102 to the server 106, which, when received by the server 106, causes the server 106 to execute a database query against the one or more databases 108, 110, wherein the database query joins a plurality of database tables, e.g., database tables of the one or more databases 108, 110, and includes a distinct aggregation function, which, when executed against the one or more databases 108, 110 aggregates only values of database records corresponding to distinct keys by which the tables are joined, regardless of the cardinality of the joined tables. The system is further configured such that the server 106 returns results of the database query to the client device 102 over a data network, e.g., a data network 104.

Although the foregoing invention has been described in some detail by way of illustration and example for purposes of clarity of understanding, it should be readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method for performing an aggregate function using a database query, the method comprising:

executing a single Structured Query Language (SQL) database query with a processor of a database engine having access to one or more relational databases as received from over a computer communications network from a requesting client, wherein the database query joins a plurality of database tables of the one or more databases and comprises a distinct aggregation function, which, when executed against the one or more databases, computes an aggregation value of an aggregation of database records corresponding to distinct keys by which the tables are joined, without creating an intermediate table, by applying a uniform hash function to convert a key value corresponding to a record value into a random value and adding the record value to the random value to provide a distinct key value-record value composite integer, the distinct keys each correlating separate data sets into a single data set for computation of the aggregation value but each differing from a value used in computing the aggregation value, the execution of the query avoiding a resultant value skewed relative to an expected value of the computed aggregation value due to a presence of more than one instance of a primary key in the database tables.

2. The method of claim 1, wherein the processor is comprised by a server device, and wherein the method comprises providing results of the database query to a client device over a network connection.

3. The method of claim 1, wherein the distinct aggregation function is a summation function configured to compute a sum of record values corresponding to distinct keys, and wherein the summation function comprises summing the distinct key value-record value composite integers and subtracting the sum of the random values to provide the sum of the record values corresponding to distinct keys.

4. The method of claim 1, wherein the distinct aggregation function is an average function configured to compute an average of record values corresponding to distinct keys, and wherein the average function comprises summing the distinct key value-record value composite integers, subtracting the sum of the random values to obtain the sum of the record values corresponding to distinct keys, and dividing the sum of the record values corresponding to distinct keys by the number of distinct keys to provide the average of the record values corresponding to the distinct keys.

5. The method of claim 1, wherein generating the distinct key value-record value composite integer comprises selecting a bit depth data type for the distinct key value-record value composite integer which is sufficient to contain a full summation of all the record values to be aggregated.

6. The method of claim 1, wherein the executing comprises:
   accessing a collection of aggregation computation instructions; selecting from the collection of aggregation computation instructions, instructions which, when executed by the processor of the database engine, cause the database engine to:
   examine only the first instance of each given key value; and
   utilize a record value corresponding to the first instance of the given key value in the distinct aggregation function.

7. The method of claim 6, wherein the collection of computation instructions is provided to the database engine by a client device.

8. The method of claim 6, wherein the collection of computation instructions is loaded as source or compiled code by the database engine.

9. The method of claim 6, wherein the collection of computation instructions is comprised by the database engine.

10. The method of claim 1, wherein the executing comprises accessing a user-defined library, wherein the user-defined library comprises instructions, which, when executed by the processor of the database engine, cause the processor of the database engine to:
   examine only the first instance of each given key value; and
   utilize a record value corresponding to the first instance of the given key value in the distinct aggregation function.

11. The method of claim 10, wherein the user-defined library is stored in database memory.

12. A non-transitory recording medium comprising instructions, which, when executed by a processor of a database engine, cause the database engine to:
   execute a single Structured Query Language (SQL) database query against one or more relational databases as received from over a computer communications network from a requesting client, wherein the database query joins a plurality of database tables of the one or more databases and comprises a distinct aggregation function, which, when executed against the one or more databases, computes an aggregation value of an aggregation of database records corresponding to distinct keys by which the tables are joined, without creating an intermediate table, by applying a uniform hash function to convert a key value corresponding to a record value into a random value and adding the record value to the random value to provide a distinct key value-record value composite integer,
   the distinct keys each correlating separate data sets into a single data set for computation of the aggregation value but each differing from a value used in computing the aggregation value,
   the execution of the query avoiding a resultant value skewed relative to an expected value of the computed aggregation value due to a presence of more than one instance of a primary key in the database tables.

13. The non-transitory recording medium of claim 12, wherein the processor is comprised by a server device, and wherein the non-transitory recording medium comprises instructions, which when executed by the processor, cause the processor to provide results of the database query to a client device over a network connection.

14. The non-transitory recording medium of claim 12, wherein the distinct aggregation function is a summation function configured to compute a sum of record values corresponding to distinct keys, and wherein the summation function comprises summing the distinct key value-record value composite integers and subtracting the sum of the random values to provide the sum of the record values corresponding to distinct keys.

15. The non-transitory recording medium of claim 12, wherein the distinct aggregation function is an average function configured to compute an average of record values corresponding to distinct keys, and wherein the average function comprises summing the distinct key value-record value composite integers, subtracting the sum of the random values to obtain the sum of the record values corresponding to distinct keys, and dividing the sum of the record values corresponding to distinct keys by the number of distinct keys to provide the average of the record values corresponding to the distinct keys.

16. The non-transitory recording medium of claim 12, wherein the non-transitory recording medium comprises instructions, which, when executed by the processor, cause the database engine to select a bit depth data type for the distinct key value-record value composite integer which is sufficient to contain a full summation of all the record values to be aggregated.

17. The non-transitory recording medium of claim 12, wherein the executing comprises:
   accessing a collection of aggregation computation instructions; and
   selecting from the collection of aggregation computation instructions, instructions which, when executed by the processor of the database engine, cause the database engine to:
   examine only the first instance of each given key value; and
   utilize a record value corresponding to the first instance of the given key value in the distinct aggregation function.

18. The non-transitory recording medium of claim 12, wherein the executing comprises accessing a user-defined library, wherein the user-defined library comprises instructions, which, when executed by the processor of the database engine, cause the processor of the database engine to:
- examine only the first instance of each given key value; and
- utilize a record value corresponding to the first instance of the given key value in the distinct aggregation function.

19. A system for performing an aggregate function using a database query, the system comprising:
- a client device;
- a server device; and
- one or more relational databases,
- wherein the client device transmits a single Structured Query Language (SQL) database query over a network connection from the client device to the server device, which, when received by the server device, causes the server device to execute a database query against the one or more relational databases as received from over a computer communications network from a requesting client, wherein the database query joins a plurality of database tables of the one or more databases and comprises a distinct aggregation function, which, when executed against the one or more databases, computes an aggregation value of an aggregation of database records corresponding to distinct keys by which the tables are joined, without creating an intermediate table, by applying a uniform hash function to convert a key value corresponding to a record value into a random value and adding the record value to the random value to provide a distinct key value-record value composite integer,
- the distinct keys each correlating separate data sets into a single data set for computation of the aggregation value but each differing from a value used in computing the aggregation value,
- the execution of the query avoiding a resultant value skewed relative to an expected value of the computed aggregation value due to a presence of more than one instance of a primary key in the database tables.

* * * * *